(12) United States Patent
Sawada

(10) Patent No.: US 6,369,917 B1
(45) Date of Patent: *Apr. 9, 2002

(54) IMAGE FORMING APPARATUS WITH TEMPERATURE CONTROL ACTIVATED BY MODE SWITCHING

(75) Inventor: Hirohisa Sawada, Abiko (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/089,422

(22) Filed: Jun. 3, 1998

(30) Foreign Application Priority Data

Jun. 6, 1997 (JP) .............................. 9-163533

(51) Int. Cl.[7] .............................. H04N 1/21; H04N 1/23; H04N 1/32
(52) U.S. Cl. ........................ 358/468; 358/296; 399/69; 399/330; 355/285
(58) Field of Search .................................. 358/400, 401, 358/468, 296; 355/285, 30; 399/33, 44, 67, 69, 70, 94, 320, 322, 328, 330, 331, 335, 338; 347/185, 186, 187

(56) References Cited

U.S. PATENT DOCUMENTS

| | | | |
|---|---|---|---|
| 5,249,062 A | * 9/1993 | Ejiri et al. | 358/296 |
| 5,321,478 A | * 6/1994 | Nakamura et al. | 399/70 |
| 5,430,468 A | 7/1995 | Sasai et al. | 346/136 |
| 5,521,686 A | * 5/1996 | Muto | 399/69 |
| 5,563,696 A | 10/1996 | Futagawa et al. | 355/285 |
| 5,565,964 A | 10/1996 | Tashiro et al. | 355/210 |
| 5,742,865 A | 4/1998 | Yajima et al. | 399/43 |
| 5,854,957 A | * 12/1998 | Morikawa | 399/70 |
| 5,903,799 A | * 5/1999 | Saito et al. | 399/69 |

FOREIGN PATENT DOCUMENTS

| | | | |
|---|---|---|---|
| DE | 35 32 739 | 3/1986 | |
| EP | 0 632 641 | 1/1995 | |
| JP | 1-76545 | * 3/1989 | G11B/7/125 |
| JP | 2-208680 | * 8/1990 | G03G/15/20 |
| JP | 6-115216 | * 4/1994 | B41J/29/00 |
| JP | 7-287474 | * 10/1995 | G03G/15/20 |

* cited by examiner

*Primary Examiner*—Kimberly A. Williams
(74) *Attorney, Agent, or Firm*—Fitzpatrick, Cella, Harper & Scinto

(57) ABSTRACT

An image forming apparatus which can shorten a first printing time in accordance with a recording mode without increasing electric power consumption is provided. When a reception signal is absent, if a copy key has been depressed, the image forming apparatus is switched to a copy mode, and temperature control is started by supplying a heater of a thermal fixing device with electric power. When the user operates a start key to start copying after setting an original and copying conditions, it is determined if the heater has reached a fixable temperature. If the result of the determination is affirmative, a copying operation is completed by performing image formation and fixing on a recording sheet. When a reception signal is present, image data is received, and after storing the image data in an image memory, temperature rise control of the heater is started.

14 Claims, 6 Drawing Sheets

IMAGE FORMING APPARATUS WITH TEMPERATURE CONTROL ACTIVATED BY MODE SWITCHING

BACKGROUND OF THE INVENTION

1. Field of the Invention

The present invention relates to an image forming apparatus, and particularly one that includes a thermal fixing device for fixing an image formed on a recording medium according to an electrophotographic process that uses a laser-beam printer or the like as image forming means on the recording medium.

2. Description of the Related Art

Figure 3:
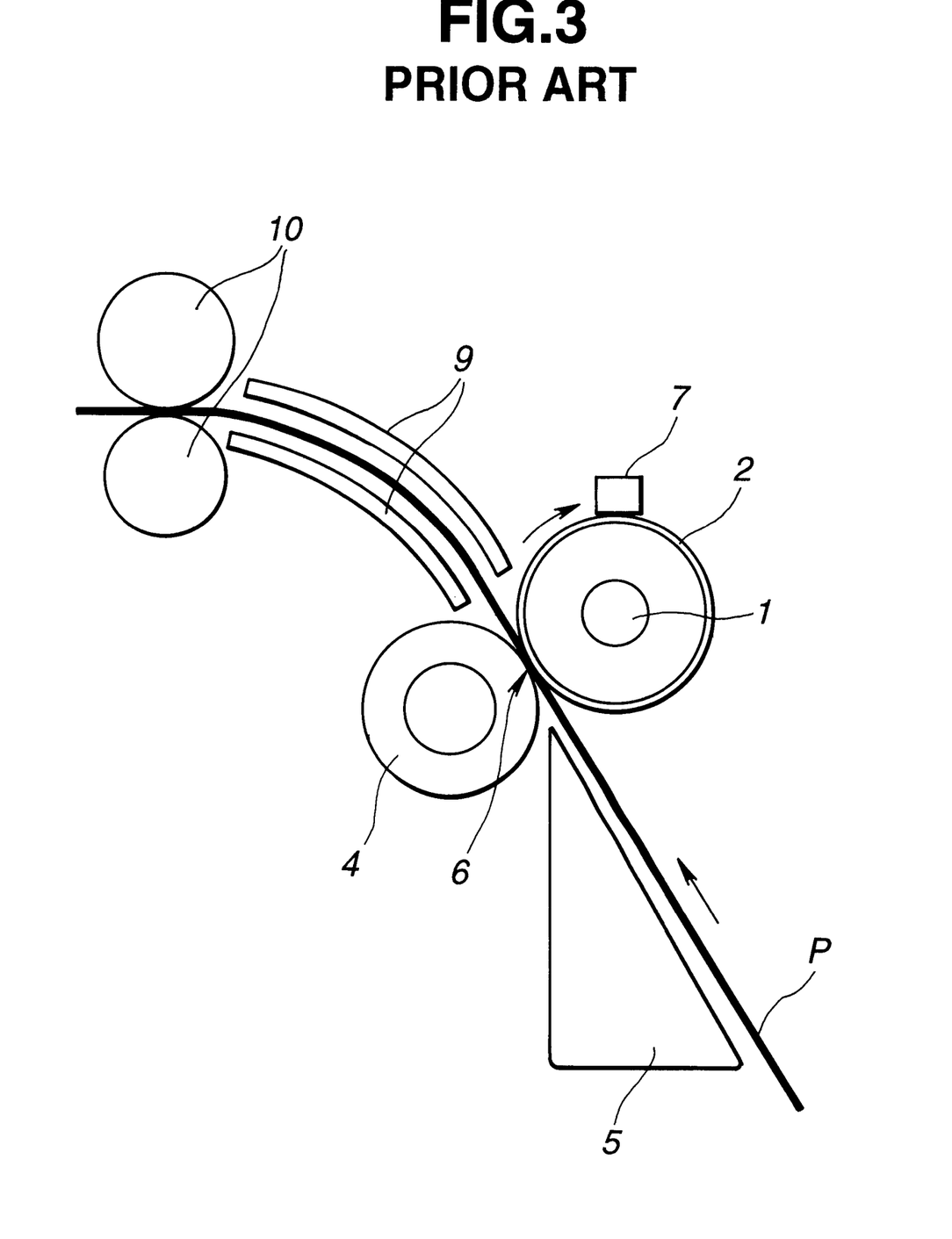
FIG. 3 is a cross-sectional view illustrating a principal portion of a thermal fixing device.

Conventionally, facsimile apparatuses, each including a heat-roller-type thermal fixing device in which a toner image formed on a recording sheet according to an electrophotographic process is fixed on the recording sheet by a heated roller, have been widely used. FIG. 3 is a cross-sectional view of a principal portion of a thermal fixing device of a conventional facsimile apparatus.

In FIG. 3, a halogen-lamp heater 1 (hereinafter abbreviated as heater 1), serving as a heating member, is disposed at a central portion of a fixing roller 2 made of a metallic material having a thickness of about 1 mm. A thermistor 7 is brought in contact with the surface of the fixing roller 2. The thermistor 7 detects the surface temperature of the fixing roller 2, and transmits a detected-temperature signal to control means (not shown). The control means controls the surface temperature of the fixing roller 2 at a predetermined fixing temperature by controlling electric power supply to the heater 1 based on the detected-temperature signal of the thermistor 7. Reference numeral 4 represents a pressing roller. A recording sheet P having a toner image formed thereon is guided by a guide member 5 to a pressing position 6 between the pressing roller 4 and the fixing roller 2, and the toner image on the recording sheet P is heated and fixed by the fixing roller 2 heated to the predetermined temperature by the heater 1. The recording sheet P having the fixed image thereon is conveyed to sheet discharging rollers 10 by guide members 9 and is discharged to the outside of the apparatus.

It is impossible to instantaneously raise the temperature of the heater 1 and the fixing roller 2 heated by the heater 1 to the predetermined temperature. Hence, in order to fix the toner image, a time is required to raise the temperature of the thermal fixing device from its ambient temperature when there is no power supply to the predetermined fixing temperature, i.e., to perform so-called temperature rise control. Facsimile apparatuses also having the function of copying documents have a plurality of recording modes, i.e., a reception mode for recording an image received by the apparatus and a copy mode for copying a document. The above-described temperature rise control for thermal fixing device for fixing a formed image is started at a constant timing in any one of the recording modes. In the copy mode, the temperature rise control of the thermal fixing device is started when the user operates a start key for starting a copying operation, for example, after setting an original on the apparatus.

In the reception mode, the user is not typically waiting for the discharged recording sheet after automatically fixing an image when after image has been received. Hence, the necessity of shortening the time from image reception until first printing and the discharge of the recording sheet is not as great. On the other hand, in the copy mode in which the user directly operates the apparatus in order to copy a document, it is desired to perform a copying operation as fast as possible by shortening a first printing time from the operation of the start key to the discharge of the recording sheet. In the above-described conventional facsimile apparatus, however, since the temperature rise control of the thermal fixing device is performed according to a constant method irrespective of switching of the recording mode, such requirement cannot be dealt with.

In order to shorten the first printing time in all of the recording modes, a method of shortening the time to raise the temperature of the thermal fixing device to a predetermined fixing temperature by always preheating the thermal fixing device can be considered. This method, however, has the problems that electric power consumption during waiting increases, and that noise is generated by a fan that is needed for discharging heat to the outside of the apparatus.

SUMMARY OF THE INVENTION

It is an object of the present invention to provide an image forming apparatus which can shorten a first printing time in accordance with a recording mode without increasing electric power consumption.

In accordance with these objects, there is provided an image forming apparatus having a plurality of modes switchable by a user, the apparatus comprising image forming means for forming an unfixed image on a recording medium, thermal fixing means for fixing the unfixed image on the recording medium, means for switching recording modes, and temperature rise control means for controlling a fixing temperature of the thermal fixing means. The temperature rise control means begins electric power supply to the thermal fixing means to start temperature control and elevate the fixing means to the fixing temperature coincident with the switching of the mode by the user.

The foregoing and other objects, advantages and features of the present invention will become more apparent from the following description of the preferred embodiment taken in conjunction with the accompanying drawings.

DESCRIPTION OF THE PREFERRED EMBODIMENT

A preferred embodiment of the present invention will now be described with reference to the drawings.

Figure 1:
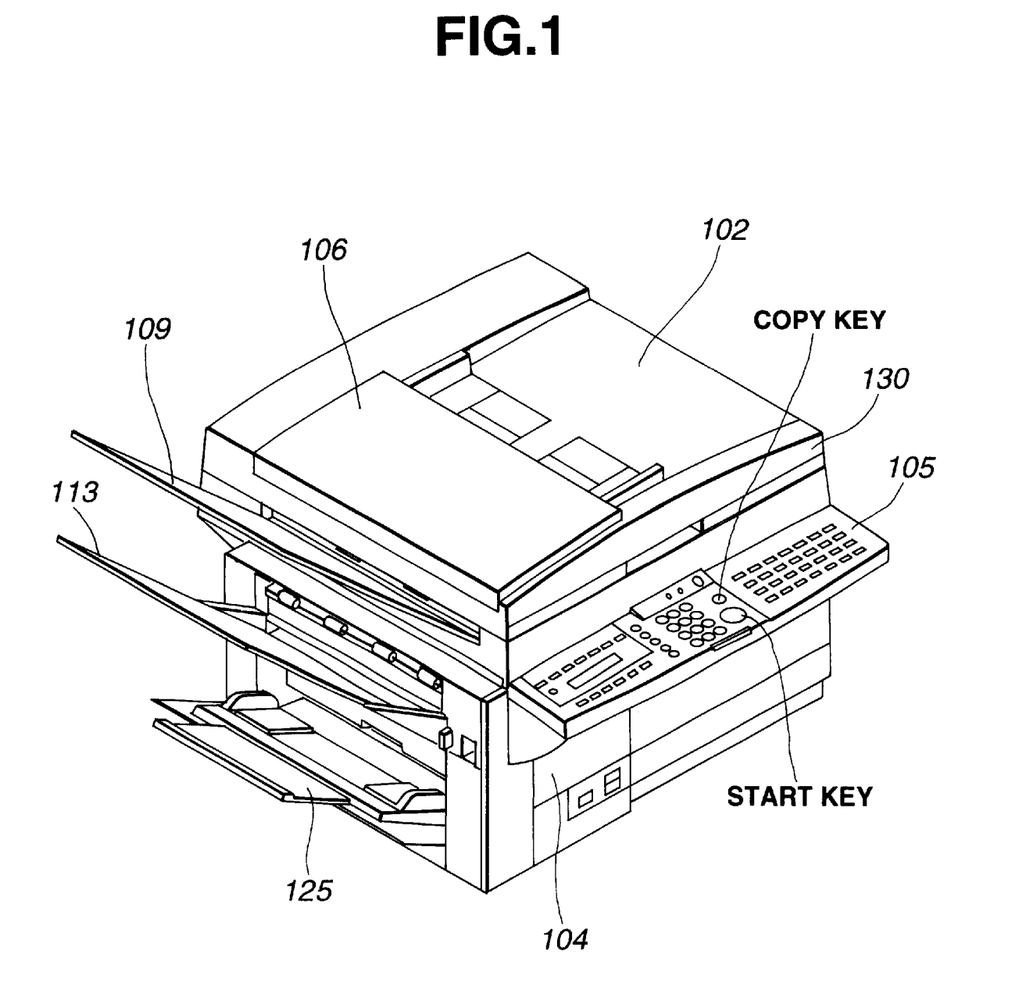
FIG. 1 is a diagram illustrating an external appearance of a facsimile apparatus according to an embodiment of the present invention.
Figure 2:
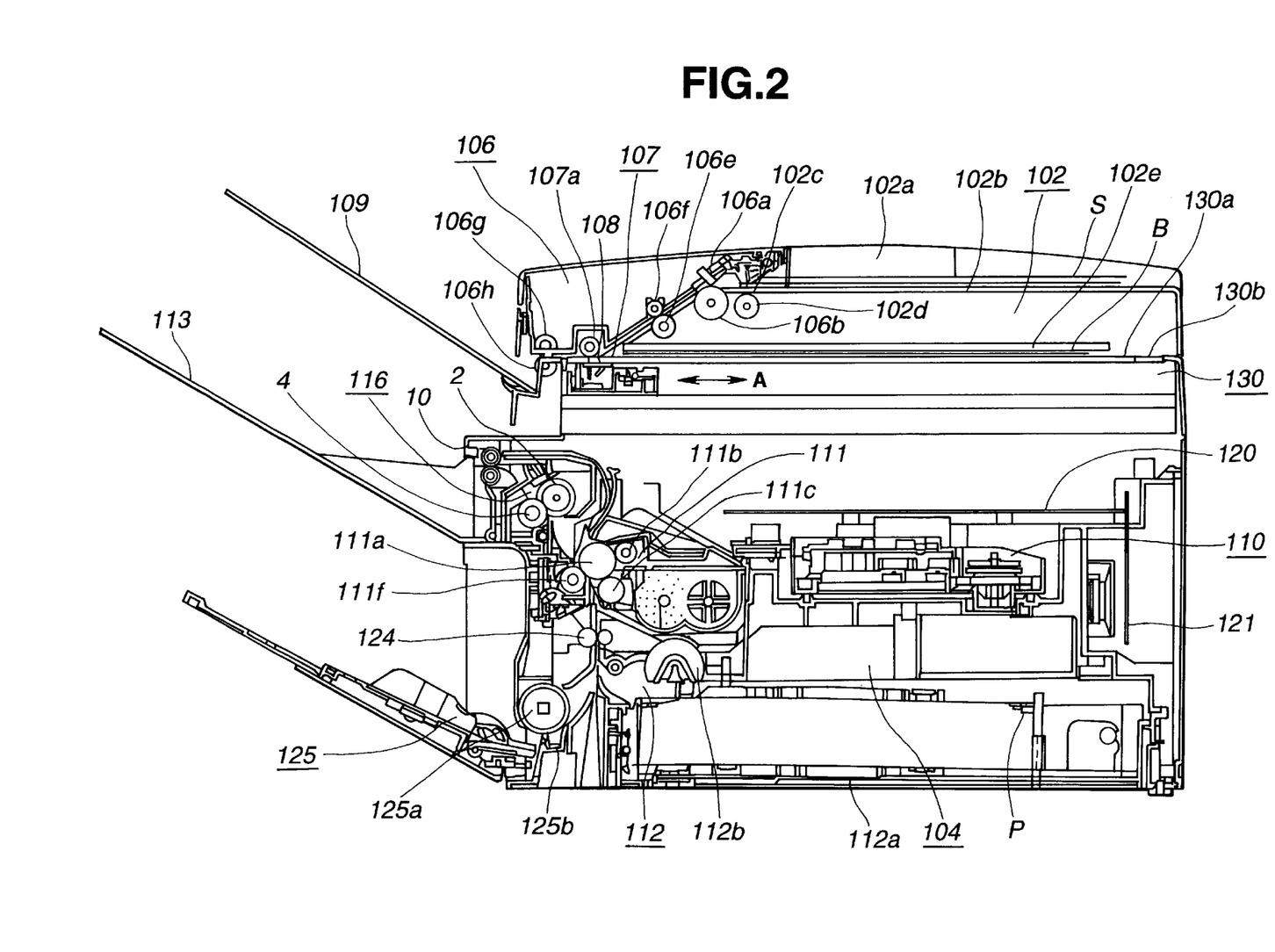
FIG. 2 is a cross-sectional view of the facsimile apparatus shown in FIG. 1.
Figure 4:
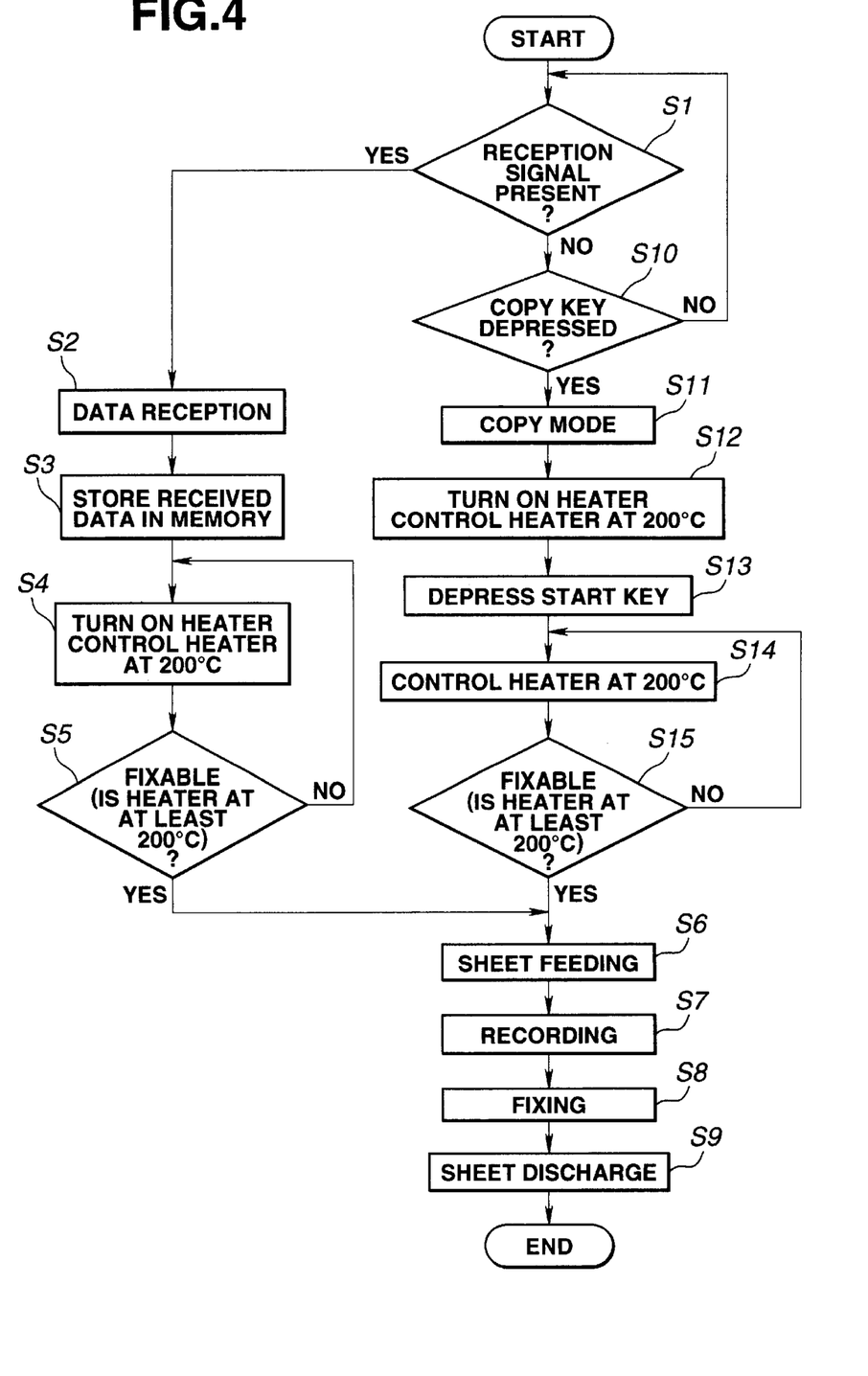
FIG. 4 is a flowchart illustrating the operation of the facsimile apparatus shown in FIG. 1.

FIG. 1 is a diagram illustrating the external appearance of an image forming apparatus used as a facsimile apparatus according to the embodiment. FIG. 2 is a cross-sectional view of the facsimile apparatus shown in FIG. 1. FIG. 3 is a cross-sectional view illustrating a principal portion of a thermal fixing device. FIG. 4 is a flowchart illustrating the operation of the facsimile apparatus shown in FIG. 1.

In FIGS. 1 and 2, a flatbed scanner unit 130 reads an original B placed on original-mount glass 130a. A pressing plate 102 can be opened/closed upward/downward. by the user, and presses the original B placed on the originl-mount glass 130a. Reference numeral 108 represents a contact-type image sensor for reading an image.

An original-mount 102b configured so as to be able to mount a plurality of originals S is provided above the pressing plate 102. An original-conveying unit 106 conveys the originals S by individually separating them. A separated original S is conveyed to and read by a sheet reading unit 107. The original-conveying unit 106 is provided at a portion of the pressing plate 102, and moves upward/downward in accordance with opening/closing of the pressing plate 102. A discharged-original tray 109 mounts discharged originals S. There are also shown a recording unit 104 comprising a laser-beam printer, a cassette sheet-feeding unit 112, a manual sheet-feeding unit 125, an image forming unit 111, a fixing unit 116 comprising a thermal fixing device, and a discharged-sheet tray 113 for mounting discharged recording sheets. An operation unit 105 includes a display unit, an input unit and the like. A control unit 120 controls the facsimile apparatus. A reception unit 121 receives image information transmitted via a communication network (not shown) and transfers the image information to the control unit 120.

The details of the main units will now be described.

Flatbed Scanner Unit

The flatbed scanner unit 130 includes the original-mount glass 130a supported by a frame 130b. In a copy mode of copying an original, the user opens the pressing plate 102 rotatably supported on the frame 130b upward, and mounts an original B on the surface of the original-mount glass 130a. An original-pressing plate 102e is supported on the pressing plate 102 so as to be upwardly/downwardly movable. By closing the pressing plate 102 downward, the pressing plate 102 presses the original B so as to be in close contact with the original-mount glass 130a.

The contact-type image sensor 108 disposed below the original-mount glass 130a includes illumination means for illuminating the surface of the original to be read, a long-focus Selfoc lens (the trade name of a lens comprising optical fibers) for passing reflected light from the surface of the original to be read, and an image sensor, disposed immediately below the Selfoc lens, for sensing the reflected light. The contact-type image sensor 108 is moved in a sub-scanning direction (indicated by a two-headed arrow A shown in FIG. 2) of the original B by driving means (not shown) while being pressed against the lower surface of the original-mount glass 130a, to read the original B on the original-mount glass 130a. The Selfoc lens of the contact-type image sensor 108 is designed to be focused on the upper surface of the original-mount glass 130a 3 mm thick. By moving the contact-type image sensor 108 so that the distance between the contact-type image sensor 108 and the original-mount glass 130a is always maintained constant, it is possible to obtain an excellent image in which out of focus portions are not present.

Original-conveying Unit

The original-conveying unit 106 conveys a plurality of originals S mounted on an original-mount 102b disposed on the upper surface of the pressing plate 102 by individually separating them. The originals S are first conveyed by a preliminary conveying roller 102d and a preliminary conveying pressing plate 102c, and are individually separated by a separation piece 106a and a separation roller 106b in pressure contact therewith. An original S is conveyed to the sheet reading unit 107 by a sheet feeding roller 106e and a sheet feeding roller 106f pressed against the sheet feeding roller 106e by a pressing spring. Reference numeral 107a represents an original-pressing roller. When reading the original S conveyed to the sheet reading unit 107, image information on the original S is read by the contact-type image sensor 108 while moving the original S on the surface of the original-mount glass 130a by the original-pressing roller 107a in a state in which the contact-type image sensor 108 stands still below the original-pressing roller 107a. The read original S is discharged onto the discharged-original tray 109 by original-discharging rollers 106g and 106h.

As described above, the original-conveying unit 106 is integrated with the pressing plate 102 so that, when the pressing plate 102 is opened upward, the original-conveying unit 106 is also moved upward. Hence, the original can be easily removed from an original-conveying path when, for example, the original is jammed. A slider 102a slidable in a direction orthogonal to the conveying direction of the original S (in the direction of the width of the original S) is provided on the original-mount 102b, so that both sides of the original S mounted on the original-mount 102b can be aligned by the slider 102a.

Recording Unit

The recording unit 104 includes a recording-sheet supply unit which includes a cassette 112a for recording sheets P and a manual sheet feeding unit 125, the image forming unit 111, and the fixing unit 116 comprising the thermal fixing device. The cassette 112a is disposed at a lower portion of the apparatus, and accommodates the stacked recording sheets P having a standard size. The recording sheets P within the cassette 112a are individually separated and fed by a feeding roller 112b. Skew of the separated recording sheet P is corrected by a pair of registration rollers 124, and the recording sheet P is fed to the image forming unit 111 provided at an upper portion in synchronization with a printing signal from the control unit 120.

Recording sheets P mounted on the manual sheet feeding unit 125 are individually separated by a sheet feeding roller 125a and a separation pad 125b disposed so as to face the sheet feeding roller 125a. Skew of the separated recording sheet P is corrected by the pair of registration rollers 124, and sheet P is fed to the image forming unit 111 in the above-described manner.

In the image forming unit 111, the surface of a photosensitive drum 111a, serving as an electrostatic-latent-image bearing member, is uniformly charged by a charging member 111b. The charged surface is exposed in accordance with image information using a laser scanner 110, to form an electrostatic latent image corresponding to the image information on the surface of the photosensitive drum 111a. By transferring toner, serving as a developer, onto the electrostatic latent image on the photosensitive drum 111a by a developing sleeve 111c, serving as a developer bearing member, a toner image is formed on the surface of the photosensitive drum 111a. The formed toner image is transferred onto the fed recording sheet P by a transfer roller 111f. The recording sheet P having the toner image transferred thereto is conveyed to the fixing unit 116 provided at an upper portion. The unfixed toner image transferred to the recording sheet P is fixed by the fixing unit 116 according to a fixing process (to be described below). The recording sheet P having the fixed image thereon is thereafter discharged onto the discharged-sheet tray 113 by a pair of sheet discharging rollers 10.

The thermal fixing device constituting the fixing unit 116 of this embodiment has the same configuration as the conventional thermal fixing device, as shown in an enlarged view of FIG. 3. In FIG. 3, reference numeral 1 represents a halogen-lamp heater. A fixing roller 2 is made of a metallic material 1 mm thick. A thermistor 7 detects the surface temperature of the fixing roller 2 by being in close contact with the surface of the fixing roller 2, and transmits a detected-temperature signal to the control unit 120. Reference numeral 4 represents a pressing roller. The recording sheet P having the toner image formed thereon is guided by a guide member 5 to a pressing position 6 between the pressing roller 4 and the fixing roller 2, and the toner image on the recording sheet P is heated and fixed by the fixing roller 2 heated by the halogen-lamp heater 1. The recording sheet P having the fixed image thereon is conveyed to the sheet discharging rollers 10 by guide members 9.

Figure 5:
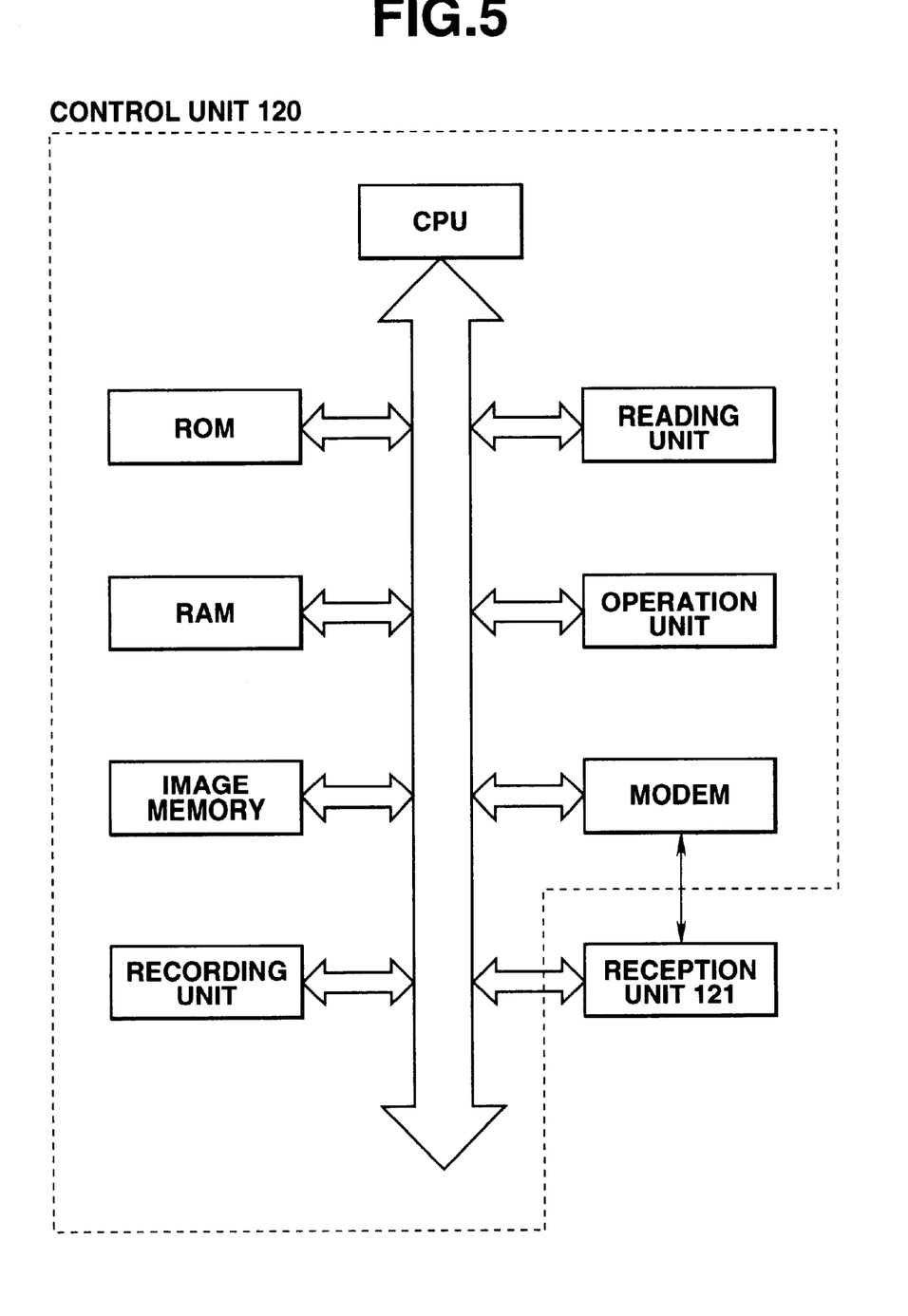
FIG. 5 is a block diagram illustrating the configuration of the control unit of the facsimile apparatus shown in FIG. 1.

FIG. 5 is a block diagram illustrating the configuration of the control unit 120 of the facsimile apparatus of the preferred embodiment.

Next, a description will be provided of the control of the thermal fixing device in the preferred embodiment. This control is performed by a CPU (central processing unit) shown in FIG. 5. A control program for the control is stored in a ROM (read-only memory) shown in FIG. 5. A RAM (random access memory) shown in FIG. 5 is used as a working area for the CPU.

When the facsimile apparatus is in a reception mode, a reception unit 121 controls communication. When received image data has been input to the reception unit 121 via a network, the input image data is modulated by a modem provided in the control unit 120 and is stored in an image memory of the control unit 120. When data for one page has been stored, the control unit 120 starts temperature rise control by supplying the halogen-lamp heater 1 with electric power. The control unit 120 controls the power supply based on the surface temperature of the fixing roller 2 detected by the thermistor 7. When the surface temperature of the fixing roller 2 has reached, a predetermined temperature adequate to allow fixing of the toner (e.g. 200° C.), the control unit 120 starts the operation of feeding a recording sheet P, so that an image based on the received image data is formed on the recording sheet P and is fixed by the thermal fixing device.

When using the facsimile apparatus of the preferred embodiment as a copier, the facsimile apparatus is switched to a copy mode by a user depressing a copy key on the operation panel of the operation unit 105. When the user operates the copy key after setting an original on the original-mount glass 130a or the original-mount 102b, the display unit of the operation unit 105 is switched to display for copying, and the user can set copying conditions, such as the number of copies, the density of copies, and the like, while watching the display. The control unit 120 starts temperature rise control by supplying the halogen-lamp heater 1 of the fixing roller 2 with electric power simultaneously with operation of the copy key. Accordingly, when the user depresses the start key to start copying after setting the copying conditions, the temperature rise control has already been proceeding. Hence, the waiting time from the user's operation of the start key until when an image is formed and fixed on the recording sheet after the thermal fixing device has reached the fixing temperature for the toner image is shortened.

FIG. 4 is a flowchart illustrating the operation of the facsimile apparatus of the preferred embodiment. The facsimile apparatus is normally in a mode for outputting a received image. In FIG. 4, first, it is determined if a signal indicating reception of image data from the network is present (step S1). If the result of the determination in step S1 is affirmative, the process proceeds to step 52, where the image data is received. After storing the received image data in memory (step S3), the temperature rise control for the fixing roller is started by activating heater 1 of the thermal fixing device (step S4). In step S5, it is determined if the surface temperature of the fixing roller 2 has reached the fixing temperature (200° C. in this embodiment). If the result of the determination in step S5 is affirmative, feeding of the recording sheet is started (step S6), an image is formed by operating the image forming unit 111 for forming an image on the recording sheet (step S7), and the image is fixed by the thermal fixing device (step S8). The recording sheet on which the image has been fixed is discharged onto the discharged-sheet tray 113 (step S9).

If the result of the determination in step S1 is negative, the process proceeds to step S10, where it is determined if the copy key has been depressed. If the result of the determination in step S10 is affirmative, the facsimile apparatus is switched to the copy mode where, for example, the display unit is switched on (step S11), and the temperature rise control is started by turning on the heater 1 of the thermal fixing device (step S12). When the user has depressed the start key to start copying after setting the original and copying conditions (step S13), it is then determined in step S15 if the fixing roller 2 has reached the fixable temperature. If the result of the determination in step S15 is affirmative, the copying operation is completed by performing image formation and image fixing on the recording sheet according to the above-described steps S6–S9. If the result of the determination in step S15 is negative, the temperature rise control for the thermal fixing device is continued (step S14). When the temperature of the fixing roller 2 has reached the fixing temperature, a copying operation is performed by forming and fixing an image on the recording sheet according to steps S6–S9.

As described above, according to the preferred embodiment, the temperature rise control for the thermal fixing device is started immediately after the copy key has been depressed in order to switch the facsimile apparatus to the copying mode, so that a first printing time from depression of the start key to start a copying operation until the recording sheet is discharged can be shortened.

Figure 6:
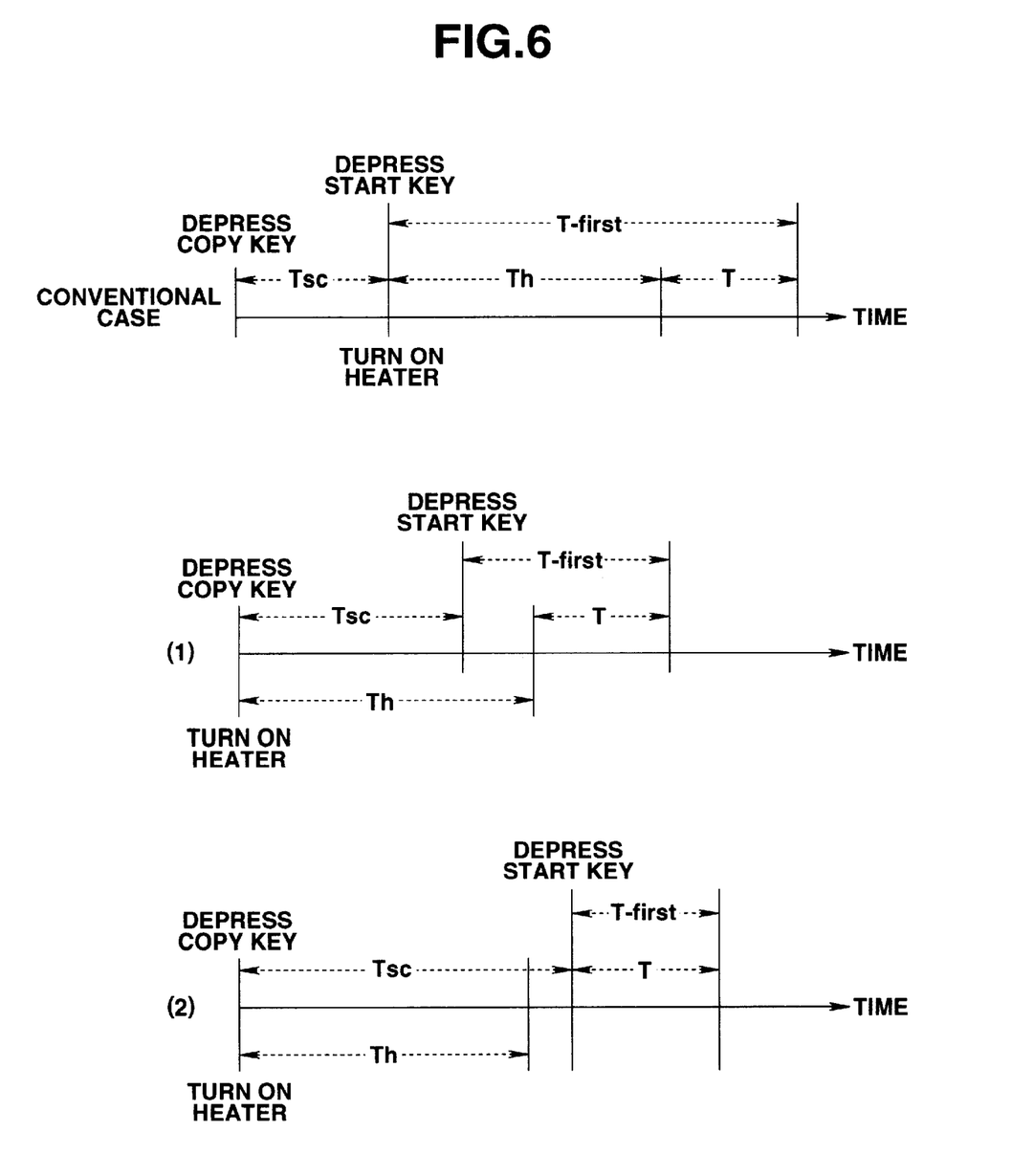
FIG. 6 illustrates the results of operations in the first embodiment.

The process of shortening the first printing time will now be described with reference to FIG. 6.

A time from an operation of depressing the copy key to an operation of depressing the start key is represented by $T_{sc}$, a time from turning on of the heater of the thermal fixing device until the temperature of the fixing roller reaches a predetermined fixing temperature is represented by $T_h$, and a time required for sheet feeding, image recording, image fixing and sheet discharging which is peculiar to the facsimile apparatus is represented by T. The time $T_{sc}$ is a time required for setting of an original on the apparatus and setting of copying conditions, such as the number and density of copies, by the user.

(1) When $T_{sc} < T_h$: The first printing time is $T_h - T_{sc} + T$. Hence, the first printing time is shortened by $T_{sc}$ compared with the first printing time $T_h + T$ of the conventional apparatus in which the temperature rise control for the heater of the thermal fixing device is started when the start key has been depressed.

(2) When $T_{sc} \geq T_h$: Since the thermal fixing device has already reached the fixing temperature when the start key has been depressed, the first printing time is T.

Hence, the first printing time is shortened by $T_h$ compared with the conventional apparatus.

In the case of $T_{sc} > T_h$ the heating time for the heater increases by $T_{sc}$ compared with the case of turning on the heater when the start key has been operated as in the conventional apparatus. However, usually, the time $T_{sc}$, i.e., the time from an operation of depressing the copy key to an operation of depressing the start key is not so long. Hence, an increase in electric power consumption is not so large.

A control may be provided in which, when the start key is not depressed even after the lapse of a predetermined time period after depressing the copy key, the temperature rise control for the thermal fixing device is interrupted, and power supply to the heater is turned off, or the operation of the start key is delayed while maintaining the apparatus in a preheating state.

In this case, once the thermal fixing device is heated, a certain amount of time is required for lowering the temperature of the thermal fixing device to a temperature in a waiting state even if power supply to the heater is turned off. Hence, when the copy key or the start key is depressed until the temperature of the thermal fixing device reaches the predetermined temperature in the waiting state, the fixing temperature can be obtained in a shorter time period than when raising the temperature of the thermal fixing device from the temperature in the waiting state. As a result, the first printing time can be shortened.

In the reception mode, since the temperature rise control is started immediately before forming an image on a recording sheet after completing storage of image data in the memory, electric power is not consumed for useless heating.

In this embodiment, a metallic roller 1 mm thick is used as the fixing roller 2. In a thermal fixing device having a short time for temperature rise control in which the temperature of the fixing roller is raised to the fixing temperature in a short time after supplying the heater with electric power, using, for example, a thin roller or a surf fixing method in which a film is used instead of the fixing roller, also, since the time $T_h$ for temperature rise control does not become 0, the present invention is effective for shortening the first printing time according to the method for controlling the thermal fixing means.

In this embodiment, a description has been provided illustrating a method of supplying the heater with electric power when operating the image forming apparatus without performing preheating of the thermal fixing device in a state of awaiting image formation. In a method of performing preheating in a waiting state, also, it is possible to shorten the first printing time in the copy mode by starting temperature rise control from a state of preheating the thermal fixing device until the fixing temperature is obtained when a copy key, serving as a key for switching the recording mode, has been depressed. Furthermore, by adopting the method for controlling the thermal fixing device according to the present invention, it is possible to lower the preheating temperature without sacrificing the first printing time, and therefore to reduce electric power consumption.

In the embodiment, a description has been provided illustrating a mode of outputting an image received by the facsimile apparatus and a copy mode as image forming modes. The present invention may, of course, also be applied to an image forming apparatus having a printer mode in which an image is formed by receiving image data from a host apparatus, such as a computer or the like, and a copy mode.

The individual components shown in outline or designated by blocks in the drawings are all well-known in the image forming apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims.

What is claimed is:

1. An image forming apparatus having a plurality of recording modes switchable by a user in which an image formed on a recording medium is fixed on the recording medium by thermal fixing means, said apparatus comprising:

a controller adapted to start temperature control to provide a fixable temperature of the thermal fixing means after a recording-mode switching operation and before initiation by the user of a printing start of the image, in a first recording mode, said controller further adapted to start temperature control to provide the fixable temperature of the thermal fixing means in accordance with a printing start of the image in a second recording mode.

2. An image forming apparatus having a plurality of recording modes switchable by a user in which an image formed on a recording medium is fixed on the recording medium by a thermal fixing device, said apparatus comprising:

a controller adapted to start temperature control to provide a fixable temperature of the thermal fixing device in accordance with a recording-mode switching operation in a first recording mode, said controller further adapted to start temperature control to provide the fixable temperature of the thermal fixing device in accordance with a printing start of the image in a second recording mode, wherein the first mode is a copy mode and the second mode is a received-image output mode, and said controller starts the temperature control of the thermal fixing device immediately after the recording-mode switching operation switches the recording mode to the copy mode.

3. An image forming apparatus according to claim 2, wherein, said controller interrupts the temperature control of the thermal fixing device when an operation of starting copying is not performed for a predetermined timer period after the temperature control of the thermal fixing device has been started by the operation of switching to the copy mode.

4. An image forming machine having a received image mode for receiving an image and a copy mode, the received image mode being a default mode, comprising:

a receiver adapted to receive image data transmitted from a remote source;

a reading unit adapted to read image data from an original;

an image forming unit adapted to form an unfixed toner image on a recording medium from one of received image data and read image data;

a fixing unit for thermally fixing the unfixed toner image;

a switch adapted to switch from the received image mode to the copy mode; and a temperature rise controller adapted to control a fixing temperature of said fixing unit, said temperature rise controller beginning electric power supply to the fixing unit to start temperature control to elevate the temperature of the fixing unit to the fixing temperature coincident with switching from the received image mode to the copy mode.

5. An image forming machine according to claim 4, wherein said switch is a copy key.

6. An image forming machine according to claim 4, wherein said fixing unit is a pair of rollers, at least one of which is heated.

7. An image forming machine according to claim 4, wherein said receiver receives facsimile messages.

8. An image forming method using a plurality of recording modes switchable by a user in which an image formed on a recording medium is fixed on the recording medium by thermal fixing means, said method comprising the steps of:

starting temperature control to provide a fixable temperature of the thermal fixing means after a recording-mode switching operation and before initiation by the user of a printing start of the image, in a first recording mode, and starting temperature control to provide the fixable temperature of the thermal fixing means in accordance with a printing start of the image in a second recording mode.

9. An image forming method using a plurality of recording modes switchable by a user in which an image formed on a recording medium is fixed on the recording medium by thermal fixing means, said method comprising the steps of:

starting temperature control to provide a fixable temperature of the thermal fixing means in accordance with a recording-mode switching operation in a first recording mode, and starting temperature control to provide the fixable temperature of the thermal fixing means in accordance with a printing start of the image in a second recording mode, wherein the first mode is a copy mode and the second mode is a received-image output mode, and the temperature control of the thermal fixing means is started immediately after switching the recording mode to the copy mode.

10. An image forming method according to claim 9, wherein, the temperature control of the thermal fixing means is interrupted when an operation of starting copying is not performed for a predetermined timer period after the temperature control of the thermal fixing means has been started by the operation of switching to the copy mode.

11. An image forming method for image forming in a machine having a received image mode for receiving an image and a copy mode, the received image mode being a default mode, comprising the steps of:

receiving image data transmitted from a remote source;

reading image data from an original;

forming an unfixed toner image on a recording medium from one of received image data and read image data;

thermally fixing the unfixed toner image;

switching from the received image mode to the copy mode; and controlling a fixing temperature by beginning electric power supply to the fixing unit to start temperature control to elevate the temperature of the fixing unit to the fixing temperature coincident with switching from the received image mode to the copy mode.

12. An image forming method according to claim 11, wherein said switching is performed by depressing a copy key.

13. An image forming method according to claim 11, wherein the fixing unit is a pair of rollers, at least one of which is heated.

14. An image forming method according to claim 11, wherein the image data received is a facsimile message.

* * * * *